United States Patent
De Oliveira et al.

(10) Patent No.: US 10,984,408 B2
(45) Date of Patent: Apr. 20, 2021

(54) METHOD FOR CONTROLLING DEPENDENCY RULES OF OBJECTS UPDATED IN A MICROCIRCUIT, AND CORRESPONDING DEVICE

(71) Applicant: IDEMIA FRANCE, Courbevoie (FR)

(72) Inventors: Marco De Oliveira, Courbevoie (FR); Aghiles Adjaz, Courbevoie (FR); Francis Chamberot, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/253,414

(22) Filed: Jan. 22, 2019

(65) Prior Publication Data

US 2019/0228403 A1 Jul. 25, 2019

(30) Foreign Application Priority Data

Jan. 23, 2018 (FR) ...................................... 1850525

(51) Int. Cl.
| | | |
|---|---|---|
| G06Q 20/34 | (2012.01) | |
| G06Q 20/36 | (2012.01) | |
| G06Q 20/40 | (2012.01) | |
| G07F 7/10 | (2006.01) | |

(52) U.S. Cl.
CPC ....... *G06Q 20/3552* (2013.01); *G06Q 20/341* (2013.01); *G06Q 20/35765* (2013.01); *G06Q 20/3672* (2013.01); *G06Q 20/401* (2013.01); *G07F 7/1008* (2013.01)

(58) Field of Classification Search
None
See application file for complete search history.

(56) References Cited

U.S. PATENT DOCUMENTS

| | | | |
|---|---|---|---|
| 6,402,028 B1 * | 6/2002 | Graham, Jr. | G06Q 20/341 235/380 |
| 2004/0172370 A1 * | 9/2004 | Bidan | G06Q 20/35765 705/75 |
| 2006/0076420 A1 | 4/2006 | Prevost et al. | |

FOREIGN PATENT DOCUMENTS

| | | |
|---|---|---|
| FR | 3051064 A1 | 11/2017 |
| WO | 02/073552 A1 | 9/2002 |
| WO | 2006/038106 A1 | 4/2006 |

OTHER PUBLICATIONS

Preliminary Search Report dated Sep. 26, 2018 in corresponding FR Application No. 1850525, 2 pages.

* cited by examiner

*Primary Examiner* — Kristy A Haupt
(74) *Attorney, Agent, or Firm* — MH2 Technology Law Group LLP

(57) ABSTRACT

A checking device and method performed by a microcircuit for dependency rules for objects updated in the microcircuit. The device and method include steps for receiving (B3) a command for updating a first object (105) stored in the microcircuit, the command giving an updated value for the first object; and verifying (B4, B4') an updating rule (106) for the first object while taking account of the updated value for the first object. The device and method can be used in microcircuits that carry out transactions.

14 Claims, 3 Drawing Sheets

METHOD FOR CONTROLLING DEPENDENCY RULES OF OBJECTS UPDATED IN A MICROCIRCUIT, AND CORRESPONDING DEVICE

CROSS-REFERENCE TO RELATED APPLICATIONS

This application claims priority to French Application No. 1850525 filed 23 Jan. 2018.

BACKGROUND OF THE INVENTION

The invention relates to the general field of electronic devices having microcircuits and suitable for carrying out operations such as transactions, e.g. in co-operation with a terminal.

The invention finds non-exclusive application with smart cards (or microcircuit or I/C cards), e.g. complying with the ISO 7816 standard. The invention relates most particularly to smart cards in compliance with the Europay Mastercard Visa (EMV) standard, version 4.3, for use in carrying out transactions.

The EMV standard is well known to the person skilled in the art and is used for making secure transactions that are carried out by smart cards, in particular bank payment transactions. Other transactions can also be carried out by these smart cards, e.g. transfer, consultation, or indeed authentication transactions.

This standard serves to make transactions secure and to limit fraud. For this purpose, it involves using cryptograms or indeed secret codes (generally referred to as personal identification numbers (PINS)).

That said, smart cards can receive commands that include errors, and might indeed be attacked by means of commands, that could put them into states in which their functions are limited. In certain circumstances, it has been observed that smart cards can be blocked after receiving such commands that include errors or during attacks.

There exists a need to avoid a command limiting the functions of a microcircuit, e.g. a microcircuit of a smart card.

The invention seeks in particular to mitigate the drawbacks set out above.

OBJECT AND SUMMARY OF THE INVENTION

The present invention satisfies this need by proposing a checking method performed by a microcircuit, the method comprising:

receiving a command for updating a first object stored in the microcircuit, the command giving an updated value for the first object; and verifying an updating rule for said first object while taking account of said updated value for the first object.

The inventors of the present invention have observed that it is updating commands that are liable to put the microcircuit in a state in which its functions are limited, or even in a state in which the microcircuit is blocked (so it can no longer be used).

Microcircuits are generally fabricated by a first entity that also performs steps that are well known to the person skilled in the art as "personalization" steps and "pre-personalization" steps (these two steps form parts of a stage known as a personalization stage). A second entity (e.g. a bank when the microcircuit is a smart card microcircuit of the bank card type). The second entity does not always have knowledge of all of the data written in the microcircuit during the pre-personalization or personalization steps. The inventors have observed that the second entity can issue an updating command that is incompatible with the microcircuit as configured during the configuration steps (pre-personalization, personalization).

By causing the microcircuit to verify directly that an updated value for the first object complies with an updating rule for the first object, it can be ensured that a command does not put the card in a state in which it is only partially functional or not functional at all.

The term "satisfy an updating rule" is used to mean that it is verified that a rule is complied with. Verification is said to "fail" if the updating rule is not complied with.

A first object may be a value stored in the memory of the microcircuit, e.g. a value written on one or more bits in order to configure the microcircuit or an application of the microcircuit. In other words, the first object may be configuration data.

In a particular implementation of the invention, the updating rule comprises at least one authorized value for the first object.

This authorized value may be stored beforehand in a memory of the microcircuit.

Thus, on receiving a command, the microcircuit can verify whether the new value for the first object is present in a list of authorized values for the microcircuit. When an updating rule is verified, it is thus verified that the updated value for the first object is an authorized value.

In a particular implementation, the method comprises a prior step of determining said at least one authorized value for the first object on the basis of a dependency rule specifying a dependency of the first object on at least one second object.

The first object is dependent on the second object. The second object may be a value stored in the microcircuit, however it could equally well be a function of the microcircuit in software or hardware. If it is a function, the microcircuit can verify that the function is present, and if it is a value, the microcircuit can verify the value. As a function of a value or of a state of the second object on which the first object depends, the dependency rule thus specifies whether the new value for the first object is an authorized value. The authorized value is then stored so that when an updating command is received, it is verified whether the new value for the first object is indeed an authorized value that has been stored previously.

It should be observed that the determination of said at least one authorized value comprises storing said at least one authorized value in a memory of the microcircuit.

In a particular implementation, the prior step of determining at least one authorized value for the first object is performed during a stage of personalizing the microcircuit (i.e. during a personalization step or during a pre-personalization step).

Thus, it is during a stage of personalizing the microcircuit that a list of authorized values is drawn up for one or more objects of the microcircuit.

This implementation is particularly advantageous since it is during this personalization stage that the microcircuit is configured, and thus knowledge is available concerning the entire configuration of the microcircuit.

Nevertheless, the invention is not limited in any way to storing said at least one authorized value during a personalization stage. Specifically, in a particular implementation, the method includes a subsequent step of determining an authorized value for at least one third object on the basis of a dependency rule for the third object and of the updated value for the first object.

Thus, after performing the verification step for the first object at its new value, it is possible to verify whether another object has a new authorized value, in particular if it depends on the first object.

Specifically, it is possible to maintain a list of authorized values for all of the objects that can be updated in the microcircuit, which list may be maintained in the microcircuit. This list itself may be updated by the microcircuit by using knowledge of the dependency rules.

In a particular implementation, said at least one authorized value for the first object is stored in the microcircuit. This may also apply to all of the authorized values for other objects.

In a particular implementation, the updating rule comprises a dependency rule for the dependency of the first object on at least one second object.

Thus, in this implementation, it is not verified directly whether the new value corresponds to an authorized value, but it is verified indirectly whether the new value is authorized, taking account of other objects. In the above-described variant, the first object depends on the second object. The second object may be a value stored in the microcircuit, however it may also be a function of the microcircuit in software or hardware. If it is a function, the microcircuit can verify that the function is present, and if it is a value, the microcircuit can verify the value. The dependency rule thus acts as a function of a value or of a state of the second object on which the first object depends to specify whether the new value for the first object is an authorized value. An authorized value is then stored so that when an updating command is received, it can be verified whether the new value for the first object is indeed an authorized value that has previously been stored.

In a particular implementation, a dependency rule giving a dependency of an object on another object specifies that a new value is authorized for the object if that other object exists, or if the other object has a predetermined value.

In a particular implementation, the dependency rule(s) is/are stored in the microcircuit.

In particular, these dependency rules may be stored in a non-volatile memory such as an electrically erasable programmable read only memory (EEPROM) or indeed in some other non-volatile memory of the microcircuit.

In another particular implementation, the dependency rule(s) is/are stored in the microcircuit during a stage of personalizing the microcircuit.

This implementation is particularly advantageous since it is during this personalization stage that the microcircuit is configured, and at that stage knowledge is available of the entire configuration of the microcircuit.

Nevertheless, the invention is not limited in any way to storing dependency rules during a personalization stage, and these rules may be stored at any time, e.g. during a transaction subsequent to the personalization stage.

In a particular implementation, error processing is performed if verification of the updating rule fails.

The inventors have observed that certain updating commands can make a microcircuit unusable without it being no longer possible to put it back into a usable state. This applies in particular for updating commands that activate writing in a memory zone that was not initially provided in the microcircuit. If such a command is received by the microcircuit, error processing can include refusal to update.

The inventors have also observed that updating commands can make the microcircuit unusable for performing certain functions, without that state being permanent, and with it being possible to put the microcircuit back into a usable state. This applies in particular to updated commands that activate a first function for which execution depends on the existence of a second function (the configuration value that activates the first function is a first object of the microcircuit, the existence of the second function is the second object, e.g. constituted by a value stored in the microcircuit, and there exists a dependency rule between this first object and the second object). Under such circumstances, error processing can authorize the updating command while performing communication subsequently to indicate that a potentially problematic update has been performed.

Alternatively, the error processing may include changing the updated value for the first object (e.g. to use an authorized value already stored in the microcircuit or an authorized value determined from a dependency rule).

In a particular implementation, the microcircuit is configured to perform transactions in compliance with the EMV standard and the command for updating the first object is a script command in compliance with the EMV standard as received during a transaction carried out by the microcircuit.

The EMV standard or "EMV integrated circuit card specifications for payment systems" in its version 4.3 of November 2011 or in a later version, specifies script commands for a so-called "issuer script". Certain EMV cards contain a so-called CPA application as defined in the "EMV integrated circuit card specifications for payment systems—command payment application" standard in its version 1.0 of December 2005 or in a later version, which standard also specifies script commands known as "issuer scripts". The invention also provides script commands for CPA applications for microcircuits containing the CPA application. In addition, it may relate to updating commands for various applications contained in the microcircuit.

These script commands are generally issued by entities that deliver microcircuits to users, and that need not be the entities that perform the steps of pre-personalizing or personalizing a microcircuit.

For example, if the microcircuit is a microcircuit of a smart card used for performing bank transactions, banks can issue script commands during transactions without having full knowledge of the configuration of the microcircuit of the smart card. A bank sending a script command might then block the microcircuit.

Furthermore, it is also possible, for fraudulent purposes, that, on gaining access to a smart card, an entity seeking to block smart cards deliberately issues such commands.

The invention also provides an electronic device including a microcircuit, the microcircuit comprising:
- a reception module for receiving an updated command for updating a first object stored in the microcircuit and specifying an updated value for the first object; and
- a verification module for verifying an updating rule for said first object, while taking account of said updated value for the first object.

The microcircuit device may be configured to perform each of the steps of the method as defined above.

The invention also provides a microcircuit card including the above-defined device.

The invention also proposes a computer program including instructions for executing steps of a method as defined above when said program is executed by a computer. It should be observed that the computer program mentioned in the present disclosure may make use of any programming language, and be in the form of source code, object code, or code intermediate between source code and object code, such as in a partially complied form, or in any other desirable form.

The invention also proposes a computer readable data medium storing a computer program including instructions for executing steps of a method as defined above.

Data (or storage) media mentioned in the present disclosure may comprise any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data media may correspond to a transmissible medium such as an electrical or optical signal suitable for being conveyed via an electrical or optical cable, by radio, or by other means. The program of the invention may in particular be downloaded from an Internet type network.

Alternatively, the data media may comprise an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an example having no limiting character.

In the figures.

DETAILED DESCRIPTION OF AN EMBODIMENT

Figure 1:
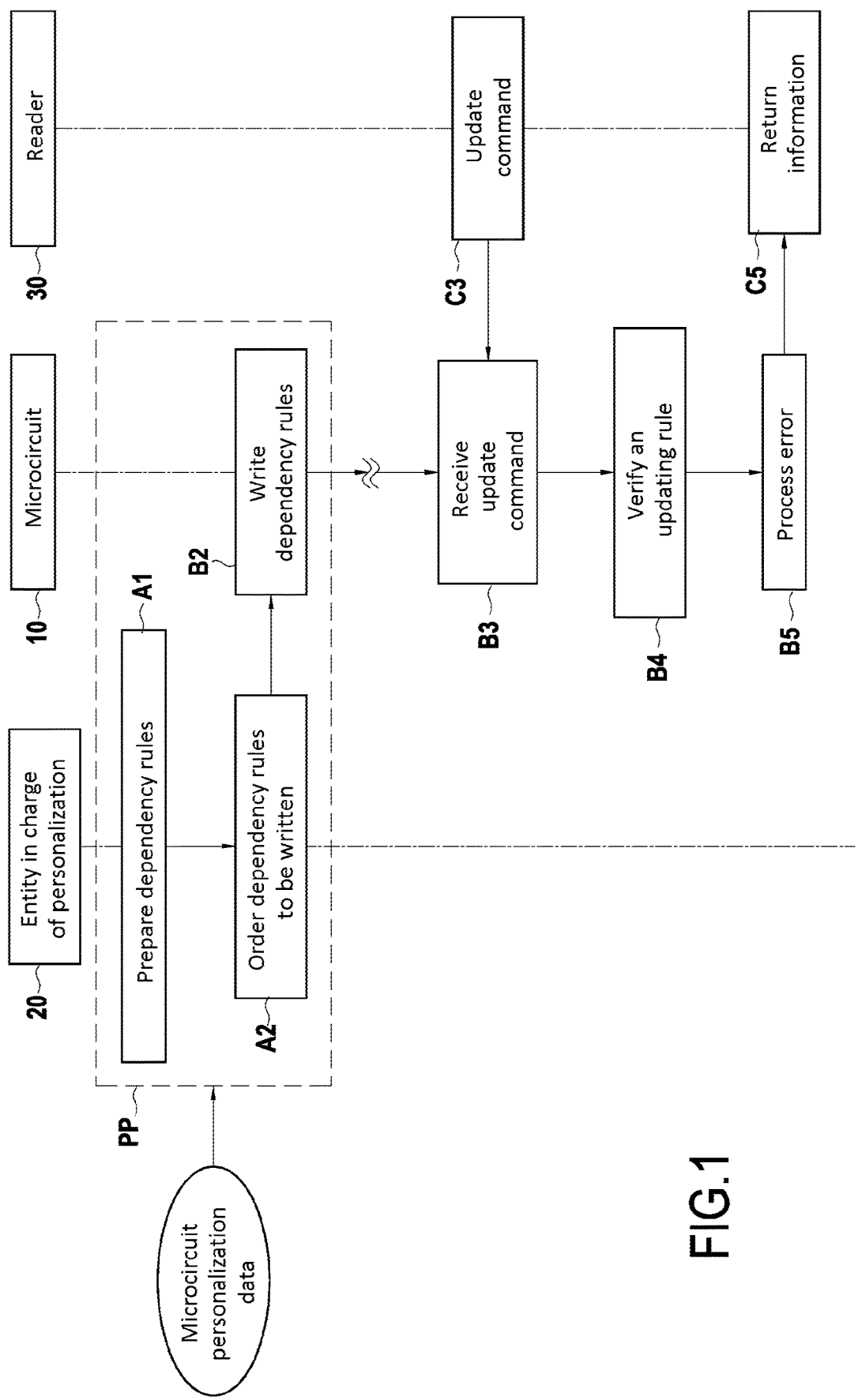
FIG. 1 is a diagram showing the various steps of an example method of the invention.

There follows a description of a checking method performed by a microcircuit.

More precisely, there follows a description both of the stages of configuring the microcircuit and also of performing the method properly speaking.

Thus, in the example described below, the microcircuit is a microcircuit of a microcircuit card (or smart card) in compliance with the EMV standard ("EMV integrated circuit card specifications for payment systems", in its version 4.3 of November 2011) and suitable for carrying out payment transactions. In particular, the microcircuit card has a CPA application as defined in the "EMV integrated circuit card specifications for payment systems—common payment application". Nevertheless, the invention is not limited to the microcircuits of microcircuit cards, nor is it limited to payment transactions.

In particular, the microcircuit may be integrated in some other type of electronic device, and it may be used for authentication or access control applications.

In the CPA standard "EMV integrated circuit card specifications for payment systems—common payment application", provision is made to perform a configuration operation by changing the values of bits stored in a non-volatile memory of the microcircuit.

For example, in the table below, possible values are given for the bits of an octet having the reference "C1" (it could also be referred to as a "tag") for configuring this application. The eight bits of this octet may be configured as set out in the following table, where "bi" is the $i^{th}$ bit of the octet C1:

| b8 | b7 | b6 | b5 | b4 | b3 | b2 | b1 |
|----|----|----|----|----|----|----|----|
| 1  |    |    |    |    |    |    |    |
|    | 1  |    |    |    |    |    |    |
|    |    | 1  |    |    |    |    |    |
|    |    |    | 1  |    |    |    |    |
|    |    |    |    | X  |    |    |    |
|    |    |    |    | 0  |    |    |    |
|    |    |    |    | 1  |    |    |    |
|    |    |    |    |    | 1  |    |    |
|    |    |    |    |    |    | 1  |    |
|    |    |    |    |    |    |    | 1  |

In this example, when the second bit b2 is "1", it indicates that verification of the personal identification number (PIN) code in the clear ("plaintext") is supported in off-line mode.

When the third bit b3 is "1", it indicates that verification of the encrypted PIN code is supported in off-line mode.

In the examples described below, the first object to be updated may be either the second bit b2 or the second bit b3.

The inventors have observed that for the second bit b2 to be able to be "1" without that affecting the operation of the microcircuit, it is necessary for the PIN code to exist in the memory of the microcircuit and for it to have been personalized. There therefore exists a dependency rule that associates this second bit with the existence of a personalized PIN.

It has also been observed by the inventors that for the third bit b3 to be able to be "1" without that affecting the operation of the microcircuit, it is necessary that:

the PIN code exists in the memory of the microcircuit and that it has been personalized;

a hardware encryption module exists (the encryption module may be a crypto-processor capable of performing modular exponentiation as used by RSA encryption);

the payment application (referred to as a CPA) is capable of using RSA encryption; and the RSA encryption key (referred to as the RSA PIN) has been personalized.

It may be observed that the person skilled in the art knows how to cause the microcircuit to perform the verifications associated with these conditions.

Thus, it may be observed that these dependency rules can be written in computer language in the memory of the microcircuit. For example, by specifying each object that can be updated using a "basic encoding rule: BER-TLV" format, and each above-mentioned dependency or condition can be cataloged by means of a tag.

In an example of the third bit b3, this bit has a table with four dependencies for verifying when an updated value is equal to "1".

These dependency tables, e.g. one table for each object of a microcircuit, which be modified by means of a CPA script command, are prepared during a preliminary stage referred to as "personalization" and shown in FIG. 1.

In this figure, there can be seen the various steps performed by a microcircuit 10, by an entity 20 in charge of personalization, and by a reader 30.

The personalization stage is referenced PP in the figure, and it is performed by an entity 20 of the microcircuit 10.

By way of indication, it may be observed that there exists a so-called personalization stage that comprises a pre-personalization step and a personalization (in the present application, a distinction is drawn between "stage" and "step"; a stage comprises steps). Pre-personalization corresponds to a step of configuring the microcircuit and/or the operating system, this step being performed by a group of microcircuits, e.g. a group of microcircuits that are all going to be issued to users by the same bank. By way of example, pre-personalization may correspond to activating and deactivating communication means (with or without contact), communications protocols, or indeed cryptographic algorithms.

The personalization step comprises writing different information for each microcircuit. This may correspond to loading cryptographic keys and certificates, or indeed data associated with the user who is to be the bearer of the microcircuit, such as name, address, or biometric data.

The personalization stage is performed on the basis of personalization data for the microcircuit as shown in the figure.

In a first step A1, the entity 20 prepares dependency rules (in particular those described above), e.g. on receiving instructions from an operator having knowledge of the personalization data of the microcircuit.

In a step A2, the entity 20 causes the dependency rules prepared in step A1 to be written in the microcircuit. The microcircuit receives the corresponding command and writes these rules in its memory (step B2), e.g. within an electrically erasable programmable read only memory (EEPROM).

Subsequently, the microcircuit 10 is handed over to a user by an issuing entity such as a bank. During a transaction, the microcircuit 10 communicates with a reader 10. During a step C3, the reader 10 issues an updating command, or script command, which, by way of example, seeks to set the above-mentioned bits b2 and b3 to "1".

This command is received by the microcircuit in step B3.

Subsequently, a step B4 is performed in which the updating rules are verified, which in this example are dependency rules associated with the new values to be given by way of example to the bits b2 and b3.

If one of the verifications of the dependency rules fails, the microcircuit 10 performs error processing B5. This error processing may comprise refusing the update, authorizing the update in combination with some other action such as returning information (represented by step C5 in the figure), or indeed changing the value for some other value.

Information returned in step C5 may be performed subsequently, e.g. during a subsequent transaction in on-line mode. It may also be performed with the entity that issued the microcircuit, which may be a bank.

Figure 2:
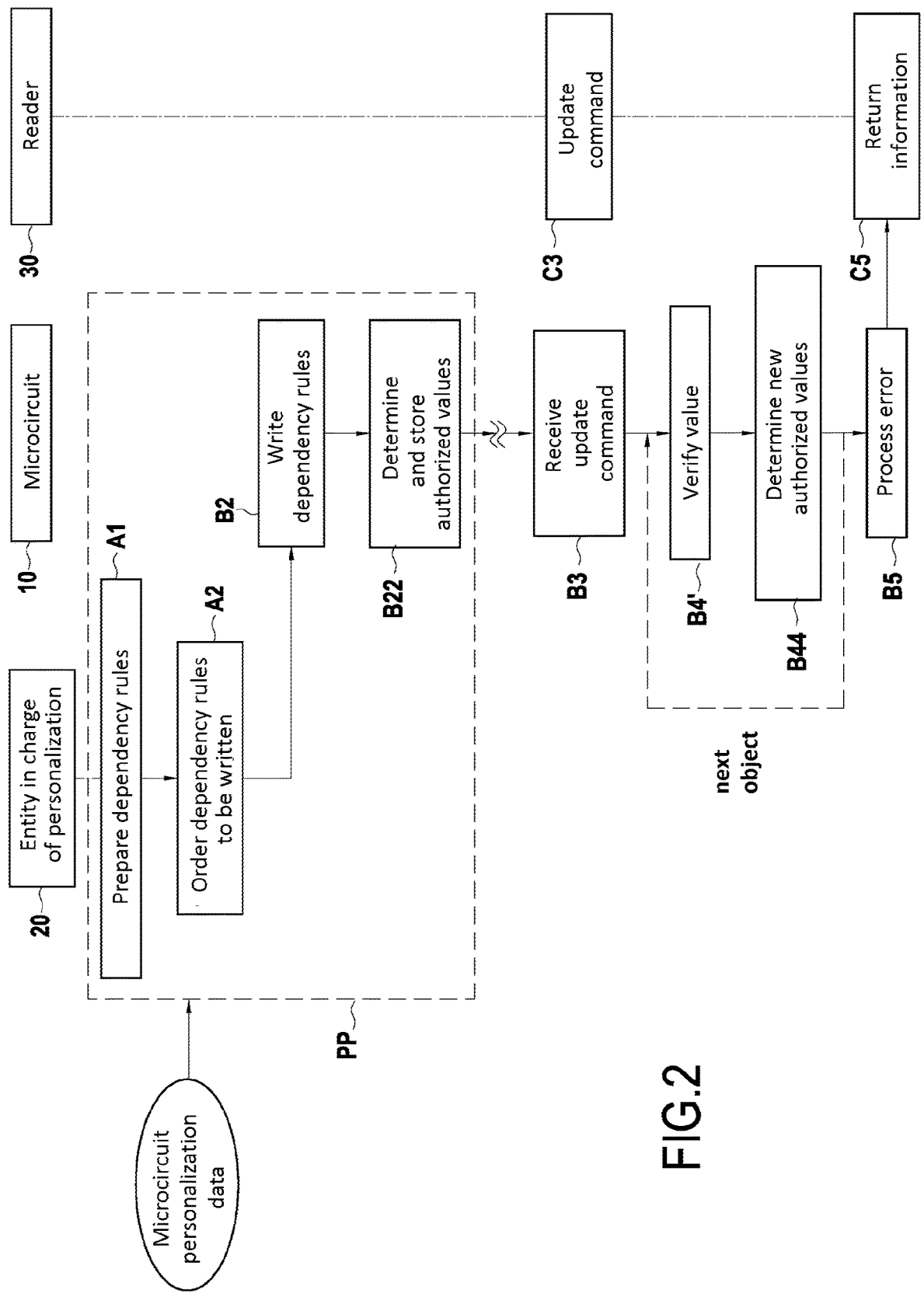
FIG. 2 is a diagram showing various steps of another example method of the invention.

In FIG. 2, elements that have the same references in FIGS. 1 and 2 are analogous. This figure shows a variant of the method shown in FIG. 1 in which the microcircuit 10 performs a step B22 after step B2 in which authorized values are determined.

By way of example, during the step B22, it is determined whether "1" and "1" are respectively authorized values for the bits b2 and b3 as specified above, given the configuration of the microcircuit after performing earlier steps in the personalization stage. This may be performed in particular as during step B4 described with reference to FIG. 1.

These authorized values are stored in the microcircuit during step B22.

After receiving an updating command in step B3, the microcircuit performs a step B4' of verifying directly whether the updated values were previously stored as being authorized values. In this variant, no verification is made as to whether the dependency rules are being complied with since, for this microcircuit, it has already been determined which values are authorized.

Thereafter a step B44 is performed during which new authorized values are determined given the update that is to be made or that has been made (either of these situations is possible, depending on whether or not the result of the verification is positive).

Specifically, once a value has been updated, if it is associated with an object that appears in a dependency rule of some other object, then the authorized value for said other object might be changed. During step B44, the new authorized value(s) are determined and stored in a memory of the microcircuit 10.

It may be observed that if the command in steps B3 and C3 seeks to modify the values of a plurality of objects, it is then possible to perform value verifications in sequential manner, possibly modifying the value of an object after the corresponding verification has succeeded.

Thus, in the example described above, the value of the bit b2 is modified after verifying its value in step B4'. This bit b2 does not appear in the dependency rules of the bit b3 having the value "1". The authorized values for the bit b3 are not modified, and thereafter the step B4' is performed a second time, but now for the bit b3.

This sequential processing of the object may also be performed in the implementation described with reference to FIG. 1.

Alternatively, it may be decided to process the updating commands in some other order. For example, it is possible to begin by processing commands that modify objects stored in the EEPROM.

Figure 3:
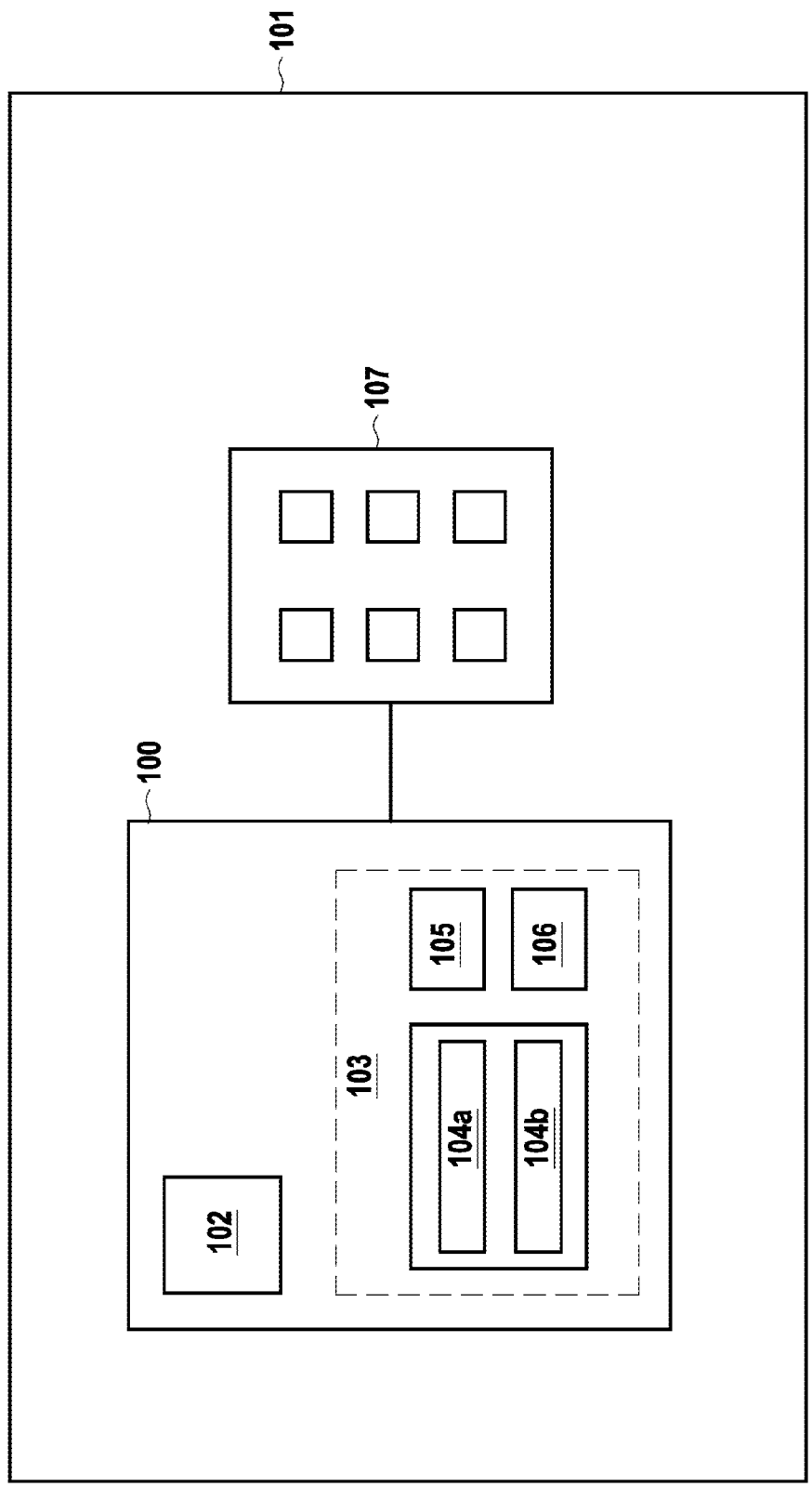
FIG. 3 is a diagram showing an example of a microcircuit card of the invention.

FIG. 3 shows a microcircuit 100 in an embodiment of the invention. The microcircuit can perform the methods described with reference to FIGS. 1 and 2.

The microcircuit 100 is arranged within a microcircuit card 101. The microcircuit card 101 is a microcircuit card complying with the ISO 7816 standard and using the CPA standard in order to carry out transactions. In this example, the microcircuit card is a bank card suitable for carrying out payment transactions.

The microcircuit 100 comprises a processor 102 and a non-volatile memory 103. Computer program instructions 104 are stored in the non-volatile memory 103.

More precisely, the computer program instructions 104 include:
- an instruction 104a for receiving a command for updating a first object 105 stored in the microcircuit and giving an updated value for the first object; and
- an instruction 104b for verifying an updating rule 106 for said first object, taking account of said updated value for the first object.

The instructions 104a and 104b together with the processor 102 form microcircuit modules configured respectively to perform the steps of receiving a command for updating a first object stored in the microcircuit and specifying an updated value for the first object, and of verifying an updated rule for said first object, given said updated value for the first object.

The microcircuit card 101 also has a communications module such as contacts 107 for carrying out transactions in communication with a reader.

The invention claimed is:
1. A checking method performed by a microcircuit, the method comprising:

receiving, by the microcircuit, a command for updating a first object stored in the microcircuit, the command giving an updated value for the first object; and verifying, by the microcircuit following receipt of the command, an updating rule for said first object while taking account of said updated value for the first object, wherein the microcircuit is configured to perform transactions in compliance with the Europay Mastercard Visa (EMV) standard and the command for updating the first object is a script command in compliance with the EMV standard as received during a transaction carried out by the microcircuit.

2. The method according to claim 1, wherein the updating rule comprises at least one authorized value for the first object.

3. The method according to claim 2, comprising a prior step of determining said at least one authorized value for the first object on the basis of a dependency rule specifying a dependency of the first object on at least one second object.

4. The method according to claim 3, wherein the prior step of determining said at least one authorized value for the first object is performed during a stage of personalizing the microcircuit.

5. The method according to claim 3, wherein a dependency rule giving a dependency of an object on another object specifies that a new value is authorized for the object if the other object exists, or if the other object has a predetermined value.

6. The method according to claim 3, wherein the dependency rule is stored in the microcircuit.

7. The method according to claim 6, wherein the dependency rule is stored in the microcircuit during a stage of personalizing the microcircuit.

8. The method according to claim 2, including a subsequent step of determining an authorized value for at least one third object on the basis of a dependency rule for the third object and of the updated value for the first object.

9. The method according to claim 2, wherein said at least one authorized value for the first object is stored in the microcircuit.

10. The method according to claim 1, wherein the updating rule comprises a dependency rule for the dependency of the first object on at least one second object.

11. The method according to claim 1, further comprising: performing error processing if verifying the updating rule fails.

12. An electronic device including a microcircuit, the microcircuit comprising:

a reception module for receiving an update command for updating a first object stored in the microcircuit, the update command specifying an updated value for the first object; and a verification module for verifying, following receipt of the update command, an updating rule for said first object while taking account of said updated value for the first object, wherein the microcircuit is configured to perform transactions in compliance with the Europay Mastercard Visa (EMV) standard and the command for updating the first object is a script command in compliance with the EMV standard as received during a transaction carried out by the microcircuit.

13. A microcircuit card including an electronic device according to claim 12.

14. A non-transitory computer readable media comprising a computer program including instructions that, when executed by a microcircuit, perform a method comprising:

receiving a command for updating a first object stored in the microcircuit, the command giving an updated value for the first object; and verifying, following receipt of the command, an updating rule for the first object while taking account of the updated value for the first object, wherein the microcircuit is configured to perform transactions in compliance with the Europay Mastercard Visa (EMV) standard and the command for updating the first object is a script command in compliance with the EMV standard as received during a transaction carried out by the microcircuit.

* * * * *